(12) United States Patent
Hirono et al.

(10) Patent No.: US 6,648,969 B2
(45) Date of Patent: Nov. 18, 2003

(54) FLUIDIZED BED GRANULATION COATING DEVICE, AND FLUIDIZED BED GRANULATION COATING METHOD

(75) Inventors: Nobuyuki Hirono, Shiga (JP); Narimichi Takei, Tokyo (JP); Kazuomi Unosawa, Tokyo (JP)

(73) Assignee: Freund Industrial Co., Ltd., Tokyo (JP)

( * ) Notice: Subject to any disclaimer, the term of this patent is extended or adjusted under 35 U.S.C. 154(b) by 0 days.

(21) Appl. No.: 10/203,699

(22) PCT Filed: Feb. 6, 2001

(86) PCT No.: PCT/JP01/00818

§ 371 (c)(1),
(2), (4) Date: Aug. 8, 2002

(87) PCT Pub. No.: WO01/58580

PCT Pub. Date: Aug. 16, 2001

(65) Prior Publication Data

US 2003/0012873 A1 Jan. 16, 2003

(30) Foreign Application Priority Data

Feb. 10, 2000 (JP) ........................................ 2000-033459
Sep. 22, 2000 (JP) ........................................ 2000-288512

(51) Int. Cl.⁷ .................................................. B01J 8/18
(52) U.S. Cl. .................. 118/309; 118/DIG. 5; 118/303; 118/704; 427/213; 427/421
(58) Field of Search .......................... 118/DIG. 5, 303, 118/309, 704, 706, 13, 417; 427/213, 421

(56) References Cited

U.S. PATENT DOCUMENTS 4,237,814 A 12/1980 Ormós et al.
5,350,567 A * 9/1994 Takeda et al. ............... 422/111

FOREIGN PATENT DOCUMENTS

EP 186474 A * 7/1986 ............ B01J/8/00
JP 49-098380 9/1974
JP 50-46574 4/1975
JP 49-37189 2/1978
JP 62282629 A 12/1987

OTHER PUBLICATIONS

Copy of PCT Publication No. WO 01/58580 A1 with International Search Report attached for PCT Ser. No. PCT/JP01/00818.
Article entitled "Granulation Handbook" edited by the Association of Powder Process Industry and Engineering, Japan, published from Ohmushu, pp. 301–303.

* cited by examiner

Primary Examiner—J. A. Lorengo
Assistant Examiner—Michelle A Lazor
(74) Attorney, Agent, or Firm—McCormick, Paulding & Huber LLP

(57) ABSTRACT

An upper processing section 10 is provided by evenly spacing out functional stations 13 having respective functions of steps constituting a fluidized bed granulation coating process, on circumferential points. An intermediate storing section 20 is provided under the upper processing section 10 by evenly spacing out powder grain storing vessels 22 corresponding to the plurality of functional stations 13, on circumferential points. A lower gas supply section 30 is provided under the intermediate storing section 20 by evenly spacing out gas supply stations 31 corresponding to the plurality of powder grain storing vessels 22. The powder grain storing vessels 22 storing powder grains sequentially proceed to the respective functional stations 13 to execute respective processes to the powder grains, and thereby granulation coating of the powder grains is performed in a batch type and a continuous type. Alternatively, the plurality of functional stations having respective functions of steps constituting the fluidized bed granulation coating process may be disposed on a straight line.

9 Claims, 11 Drawing Sheets

Fig. 3
Fig. 3A
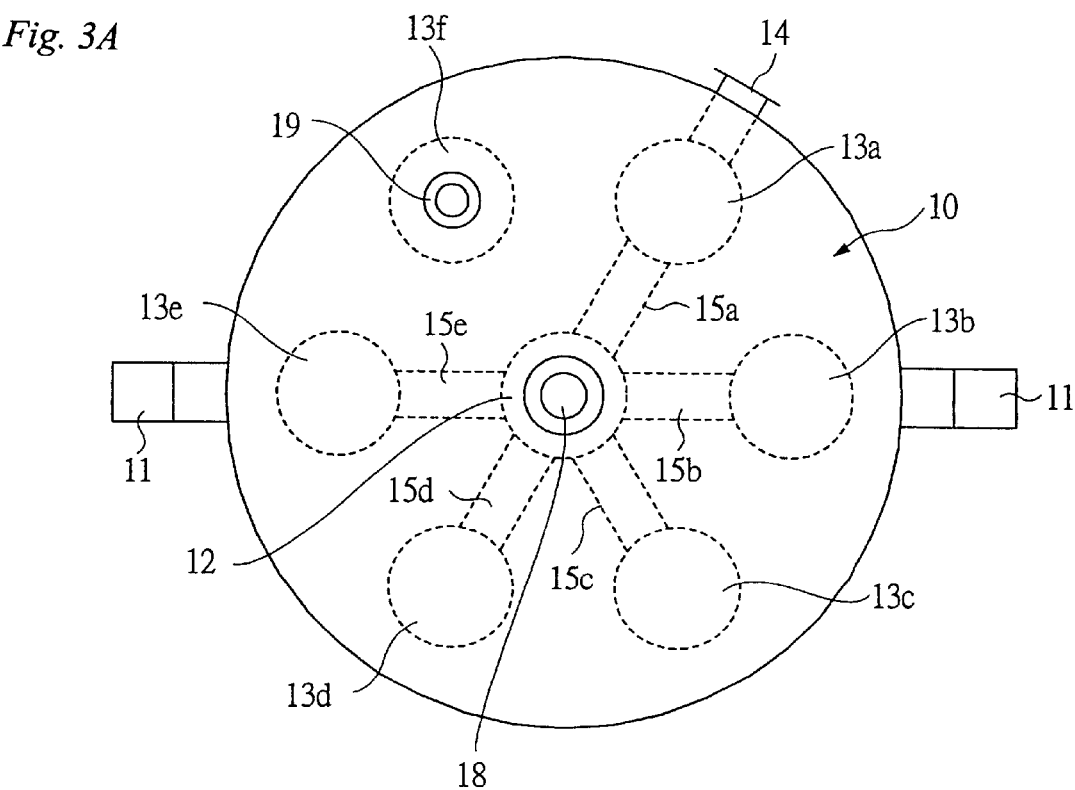
Fig. 3B
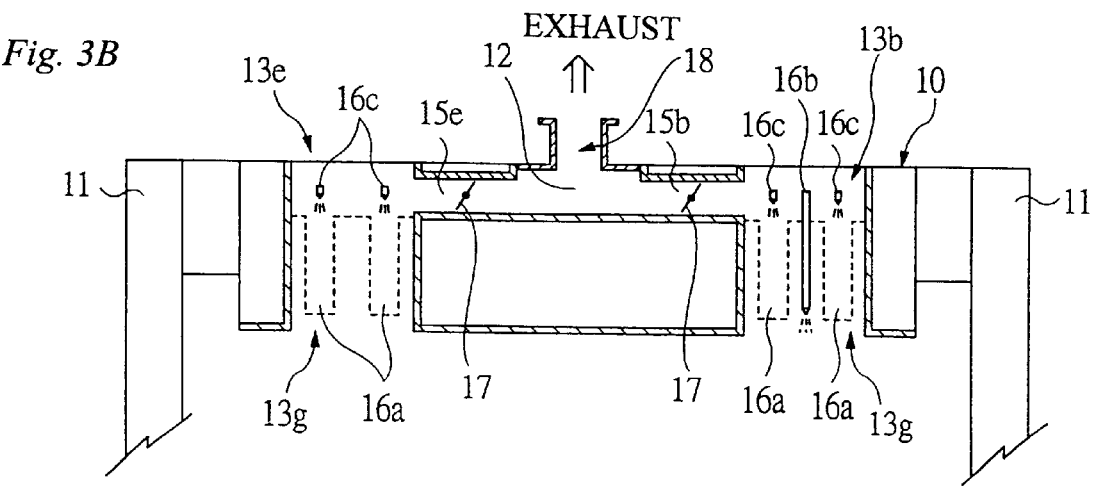

Fig. 4
Fig. 4A
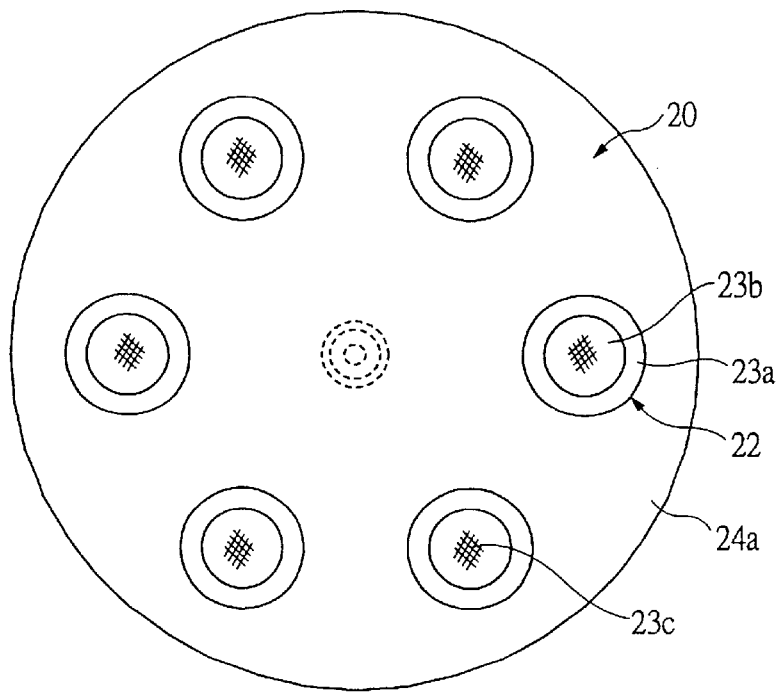
Fig. 4B
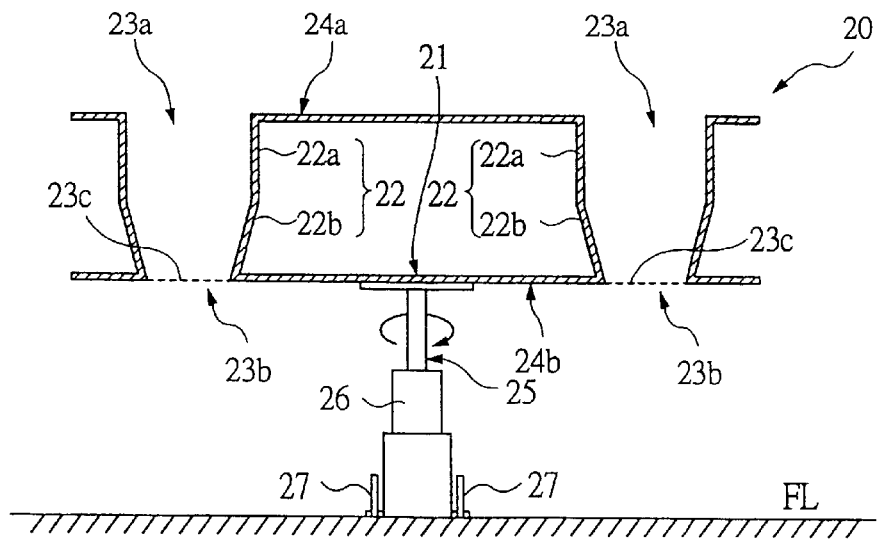

Fig. 5
Fig. 5A
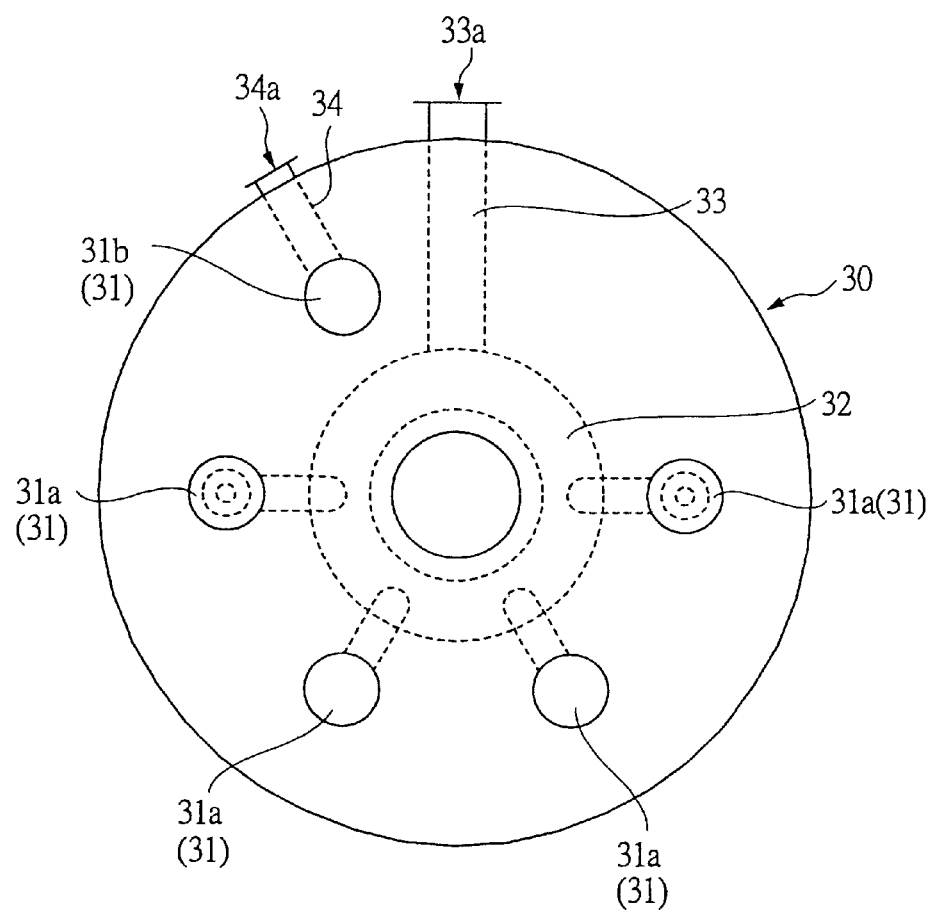
Fig. 5B
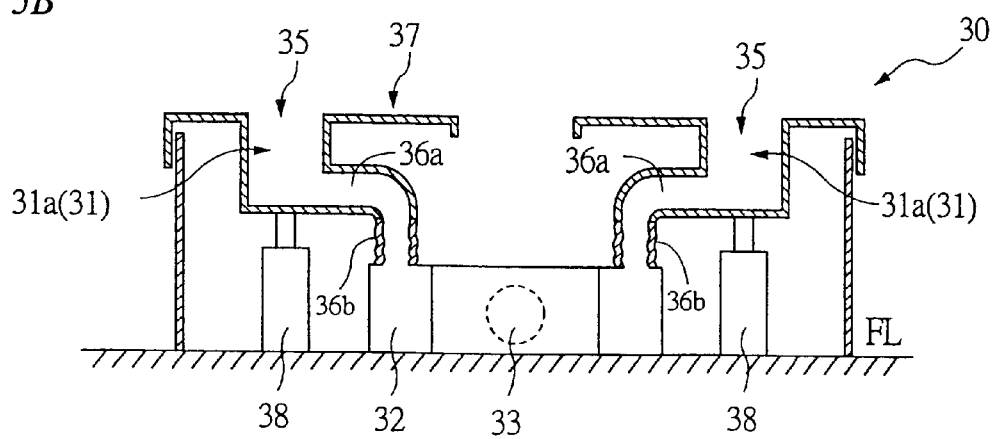

Fig. 7
Fig. 7A
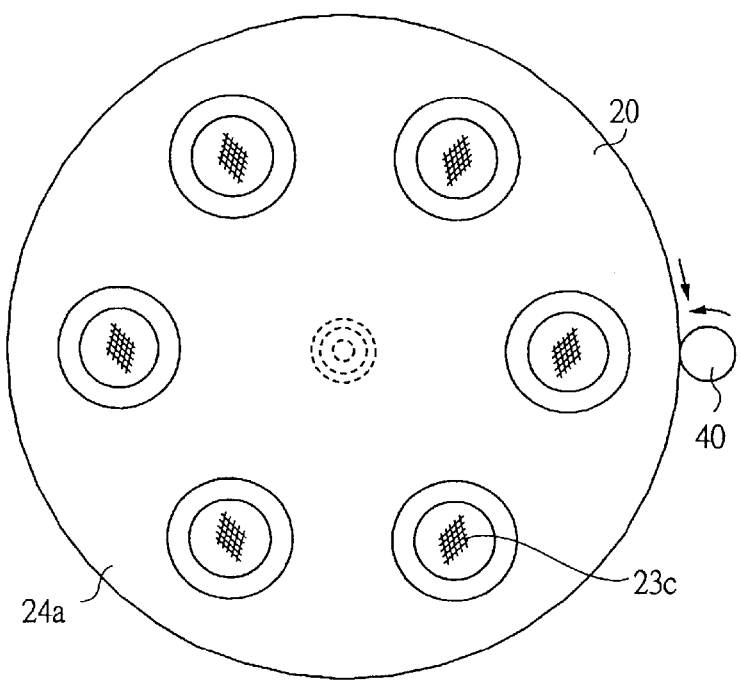
Fig. 7B
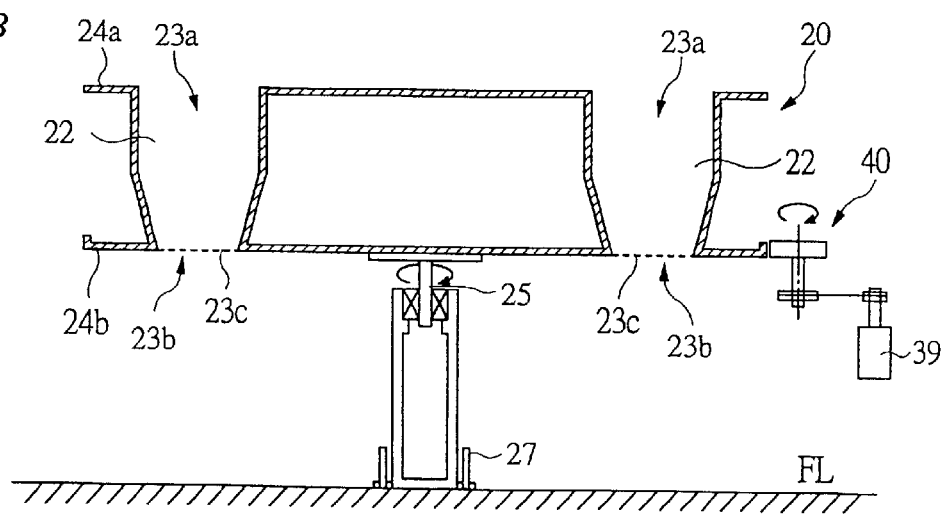

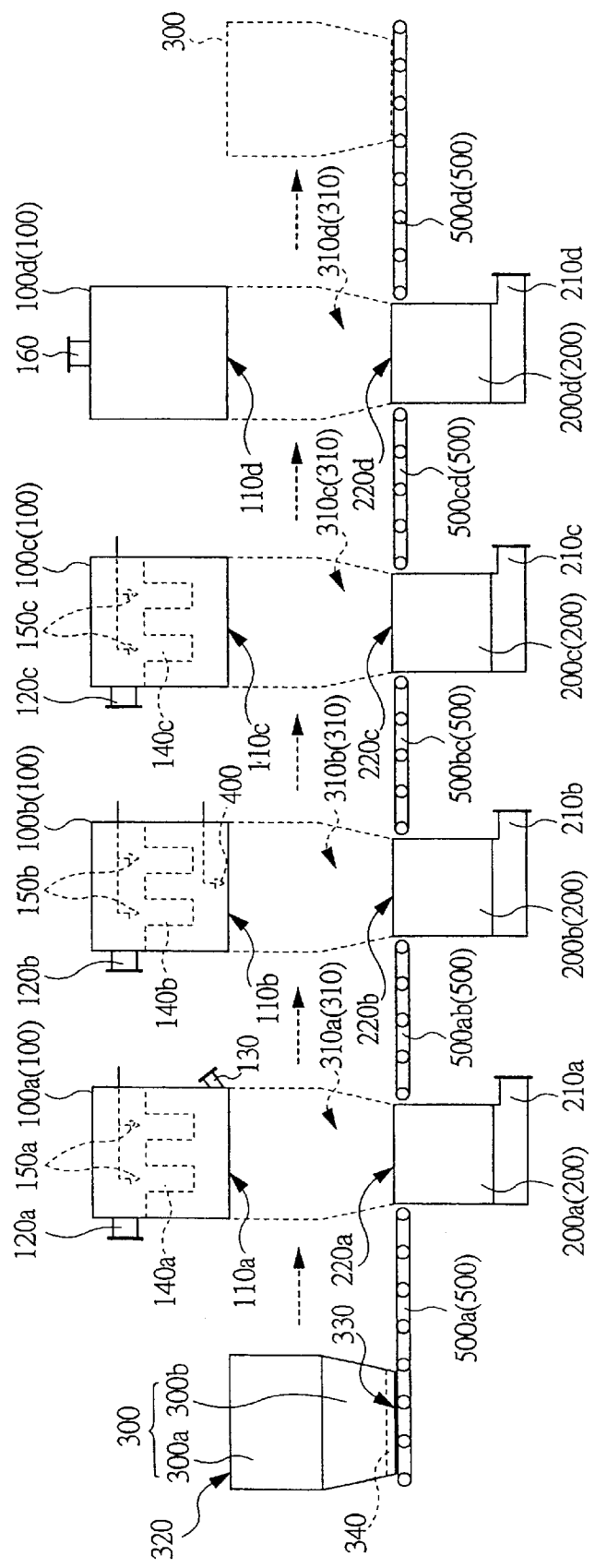

FLUIDIZED BED GRANULATION COATING DEVICE, AND FLUIDIZED BED GRANULATION COATING METHOD

REFERENCE TO PRIOR APPLICATION

This application is entitled to the benefit of and incorporates by reference essential subject matter disclosed in PCT Patent Application No. PCT/JP01/00818 filed on Feb. 6, 2001; Japanese Application No. 2000-288512 filed Sep. 22, 2000; and Japanese Application No. 2000-33459 filed Feb. 10, 2000.

TECHNICAL FIELD

The present invention relates to a granulation coating technique for performing a process such as granulation, coating, mixing, agitation, drying or the like of powder grains with the powder grains fluidized.

BACKGROUND ART

A fluidized bed device can perform granulation coating and drying of pharmaceuticals, food or the like within a single device and has an airtight structure, so that it is a suitable device in view of GMP. Therefore, granulation substances obtained by using this have characteristics of comparatively porous and amorphous shapes and good solubility, and so are widely utilized.

While there are many kinds of fluidized bed devices (for example, "Granulation Handbook", edited by The Association of Powder Process Industry and Engineering, Japan, published from Ohmusha, pp. 283–348), the devices are roughly divided into a batch type and a continuous type (including a semi-continuous type and a continuous type) as methods of operation.

Presently, in most cases of performing granulation for pharmaceuticals or the like, the batch type of the device is utilized. This is because the batch type thereof is more suitable for obtaining uniform granulation substances in particle size, and is superior in view of GMP since satisfactory dry products can be obtained within the same device and no generated particles need to be transferred to another drying device.

In contrast thereto, in the continuous type as illustrated, for example, in FIG. 7.56 of page 301 and FIG. 7.57 of page 302 in the "Granulation Handbook", raw materials are continuously injected and granulation substances classified by a principle of gas classification or the like are continuously discharged. This does not need independent steps preceding and following a main step of raw material injection, preliminary mixing, heating, cooling, discharging or the like, and therefore the processing time thereof is shortened. Control and management of the step can be also facilitated since performing stationary operations becomes possible theoretically.

However, particles of all stages of a granulation process are included in a fluidized bed obtained by using the continuous type thereof and are classified by the gas classification and are discharged, so that there are such drawbacks that classification effect is difficult to expect entirely and a particle size distribution of products to be discharged becomes large, and that products to be dried completely are not obtained since the granulation substances are discharged from a fluidizing chamber in which binder liquids are continuously sprayed, and the like.

Suggestions have been made for improving these drawbacks. For example, the device disclosed in Japanese Patent Laid-open No. 62-282629 is provided with a drying chamber adjacent to a granulation chamber, but the drying chamber has a drying effect and contributes to no improvement in a particle size distribution. Also, the devices described in FIG. 7.59 and FIG. 7.61 of page 303 of the "Granulation Handbook" are each provided with a classifier to keep particle sizes uniform. However, these devices are each suggested as a system and they themselves are not necessarily improved. Therefore, non-uniformity of particle sizes of the products obtained by the continuous type remains fatefully without being improved.

Also, since the batch type of the device intermittently performs injection and discharge, an operating property of the semi-continuous type has an intermediate property of those of the batch type and the continuous type and the semi-continuous type is a type more similar to either one regarding the relation between an injection and discharge amount and a process amount (a retention amount). Therefore, a merit and demerit of the semi-continuous type has an intermediate property of those of both types.

To compensate for such a demerit of the continuous type as described above, the device of a batch type is used in granulation, coating and the like of pharmaceuticals. However, the device has a problem of scaling up the fluidized bed device as the production thereof is scaled up.

More particularly, upsizing the device causes extensions of the time required for a batch in comparison to a small-sized device, so that the production capacity per unit time does not become proportional to a charge amount but will be below the charge amount. This is because while the amount of charge increases in proportion to a device size to the third power, an amount of fluidizing gas for maintaining an optimal fluidized condition is proportional to the device size to the second power (cross section area) and a drying speed of contents is proportional to the amount of fluidizing gas and so the time required for the drying increases in proportion to the device size.

In a large-sized device, a bulk density of the granulated particles becomes large and thereby the above-mentioned advantages of the fluidized bed granulation substances are reduced. It is thought that this is because the particles continuously repeat movements of dropping to a bottom portion thereof even during fluidization and thereby weight of the particles in being temporally deposited becomes larger than that of a small-sized device.

Even from the viewpoint of operation, the larger the device becomes, the more difficult maintaining a good fluidizing condition becomes and faulty fluidizing conditions such as channeling, bubbling, slagging or the like are likely to occur.

As described above, since it is not favorable to upsize the fluidized bed device to a more degree than a certain degree, small-sized devices with used experience are arranged in parallel and the same granulating processes is performed by at least two of the small-sized devices.

However, in this method, it is likely that there will arise problems of no improvement in a floor area for setting the devices and/or in production efficiency per worker as the production scale is increased, and of being unable to enjoy merits of mass production, and further of non-uniform quality of the granulation substances owing to unevenness of respective operating conditions between the devices. This is because there is also the fact that, in the fluidized beds, the number of operating conditions is large in comparison with other granulating methods and this method is more easily developed than other methods owing to an influence of the unevenness.

The inventors of the present invention have thus come to the idea that it is necessary to develop a device of continuous type, which is capable of improving the production capacity as well as taking advantages of a batch type device.

An object of the present invention is to provide a fluidized bed granulation coating device in which processes that are based on respective steps constituting the fluidized bed granulation coating process are arranged to be of a batch type and such respective processes arranged to be of a batch type are continuously performed.

An object of the present invention is to provide a method of fluidized bed granulation coating, in which batch type operations that are based on respective steps constituting fluidized bed granulation processes are continuously performed.

SUMMARY OF THE INVENTION

The fluidized bed granulating coating device of the present invention is characterized by: an intermediate storing section having a plurality of powder grain storing vessels circulated by a circulating means; an upper processing section including a plurality of function stations having respective functions of steps constituting a fluidized bed granulation coating process; and a lower gas supply section having gas supply stations, wherein said powder grain storing vessels of said intermediate storing section is stopped and circulated by said circulating means per each function station, and wherein when said powder grain storing vessels are stopped at said function stations, upper connecting openings of said powder grain storing vessels are connected to lower connecting openings of the respective function stations of said upper processing section and lower connecting openings of said powder grain storing vessels are connected to an upper connecting opening of said gas supply stations of said lower gas supply section.

Said circulating means is, for example, characterized by a rotating means in which said plurality of powder grain storing vessels provided at the same circumferential positions about a rotational center are rotated around said rotational center regarded as a center. Said plurality of function stations is, for example, characterized by including all or a part of a raw material supply station, a granulation coating station, a drying station and a product discharging station.

Said raw material supply station and said product discharging station are, for example, characterized by being constituted by the same station with which a raw material supplying pipe and a product discharging pipe are each provided selectively and usably. Said granulation coating station and said drying station is, for example, characterized by being communicated to a common exhaust opening through a chamber. Said gas supply stations are, for example, characterized by being separated into a fluidized bed forming gas supply stations and a product discharging gas supply station.

Another phase of the present invention is characterized by: using the fluidized bed granulation coating device having any one of the above-mentioned structures; sequentially moving powder grain storing vessels storing powder grains, to function stations having respective functions of steps constituting a fluidized bed granulation coating process in an upper processing section of said fluidized bed granulation coating device, respectively; and supplying gas from a lower gas supply section of said fluidized bed granulation coating device, and thereby performing granulation and/or coating of said power grains accommodated in said powder grain storing vessels.

In a representative fluidized bed granulation coating device of the present invention, to, for example, the function stations having respective functions such as a raw material supplying step, a granulating step, a drying step, a product discharging step and the like constituting the fluidized bed granulating coating process, the plurality of powder grain storing vessels provided at positions radially extending from a rotational center are rotated about the rotational center regarded as a center by a rotating means, and sequentially circulate through the respective function stations. In addition, by gas supply into the powder grain storing vessels from below through the gas supply station, the powder grains accommodated in the powder grain storing vessels can be granulated and coated.

Thus, the fluidized bed granulation coating device of the present invention is constituted so as to take elements of a batch type and elements of a continuous type and have advantages obtained from both types by sequentially circulating, through the function stations, the powder grain storing vessels storing the powder grains.

By utilizing the fluidized bed granulation coating device with such a structure and further using the method of the present invention, in which the powder grains are granulated and coated in a fluidized bed state, while uniformity of particle diameters thereof is ensured, mass productivity achieved through a continuous type can be also ensured.

The present invention further is characterized by: a plurality of powder grain storing vessels moved by a moving means; a plurality of function stations having respective functions of steps constituting a fluidized bed granulation coating process, and disposed in a non-circular state; and gas supply stations provided to correspond to said function stations, wherein said powder grain storing vessels are stopped and moved per each function station by said moving means, and wherein when said powder grain storing vessels are stopped at said function stations, upper connecting openings of said powder grain storing vessels are connected to lower connecting openings of said function stations and lower connecting openings of said powder grain storing vessels are connected to upper connecting openings of said gas supply stations. Said plurality of function stations are characterized by being disposed on a substantially straight line.

Said plurality of function stations are characterized by including all or a part of a raw material supply station, a granulation coating station, a drying station and a product discharging station.

The fluidized bed granulation coating method according to the present invention is characterized by: using the fluidized bed granulation coating device having any one of the above-mentioned structures; and performing granulation and/or coating of said powder grains accommodated in said powder grain storing vessels.

BRIEF DESCRIPTION OF THE DRAWINGS

FIG. 3A is a plan view illustrating an upper processing section of the fluidized bed granulation coating device according to an embodiment of the present invention.

FIG. 3B is a cross-sectional view illustrating an upper processing section of the fluidized bed granulation coating device according to an embodiment of the present invention.

FIG. 4A is a plan view illustrating an intermediate storing section of the fluidized bed granulation coating device according to an embodiment of the present invention.

FIG. 4B is a cross-sectional view illustrating an intermediate storing section of the fluidized bed granulation coating device according to an embodiment of the present invention.

FIG. 5A is a plan view illustrating a lower gas supply section of the fluidized bed granulation coating device according to an embodiment of the present invention.

FIG. 5B is a cross-sectional view illustrating a lower gas supply section of the fluidized bed granulation coating device according to an embodiment of the present invention.

FIG. 7A is a plan view illustrating a modified example of a structure for rotating the intermediate storing section of the fluidized bed granulation coating device according to an embodiment of the present invention.

FIG. 7B is a cross-sectional view illustrating a modified example of a structure for rotating the intermediate storing section of the fluidized bed granulation coating device according to an embodiment of the present invention.

FIG. 8 is an overall front view illustrating the fluidized bed granulation coating device according to an embodiment of the present invention.

BEST MODE FOR CARRYING OUT THE INVENTION (Embodiment 1)

Figure 1:
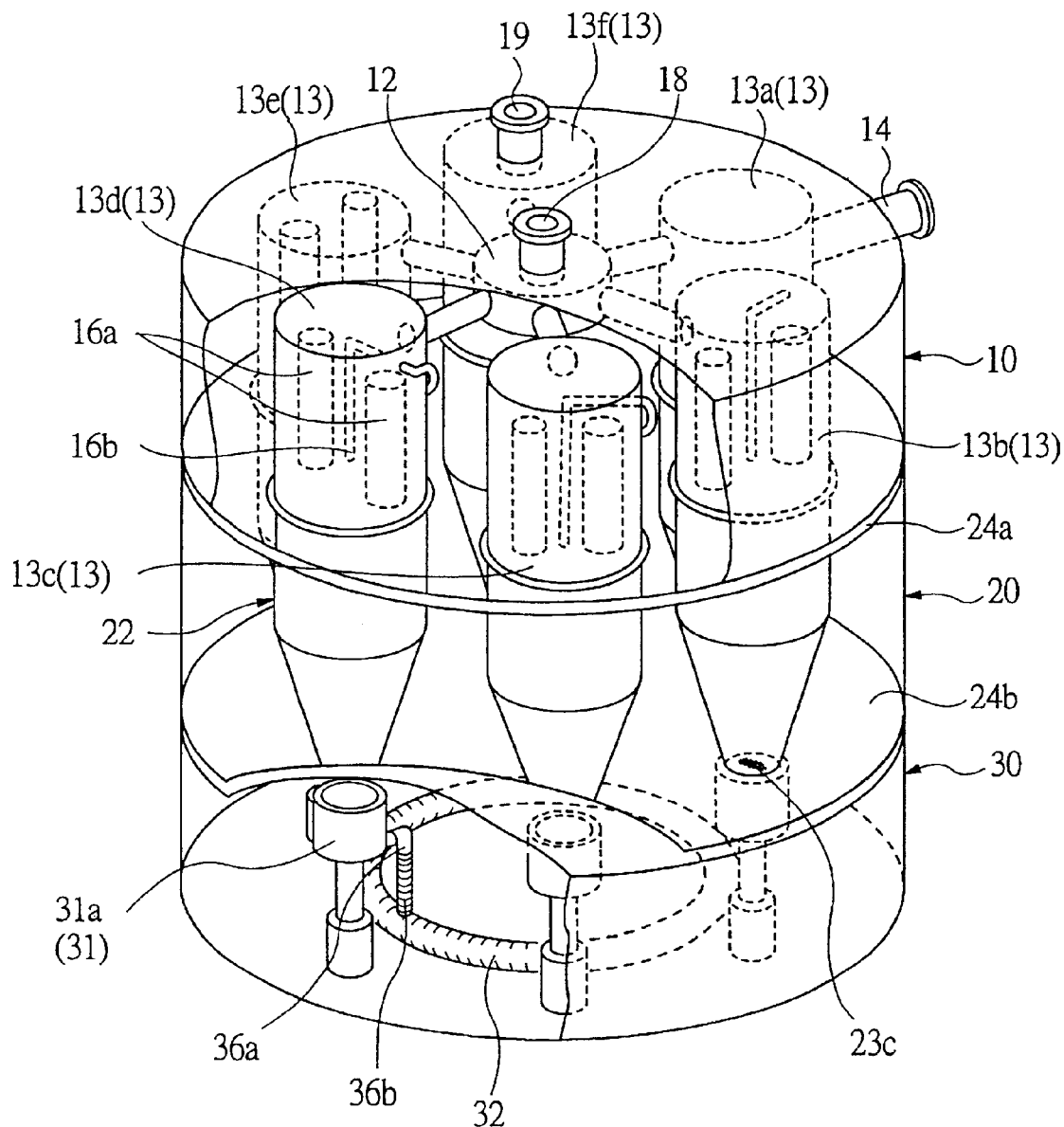
FIG. 1 is a partially notched perspective view illustrating one example of a structure of a main body in a fluidized bed granulation coating device according to an embodiment of the present invention.
Figure 2:
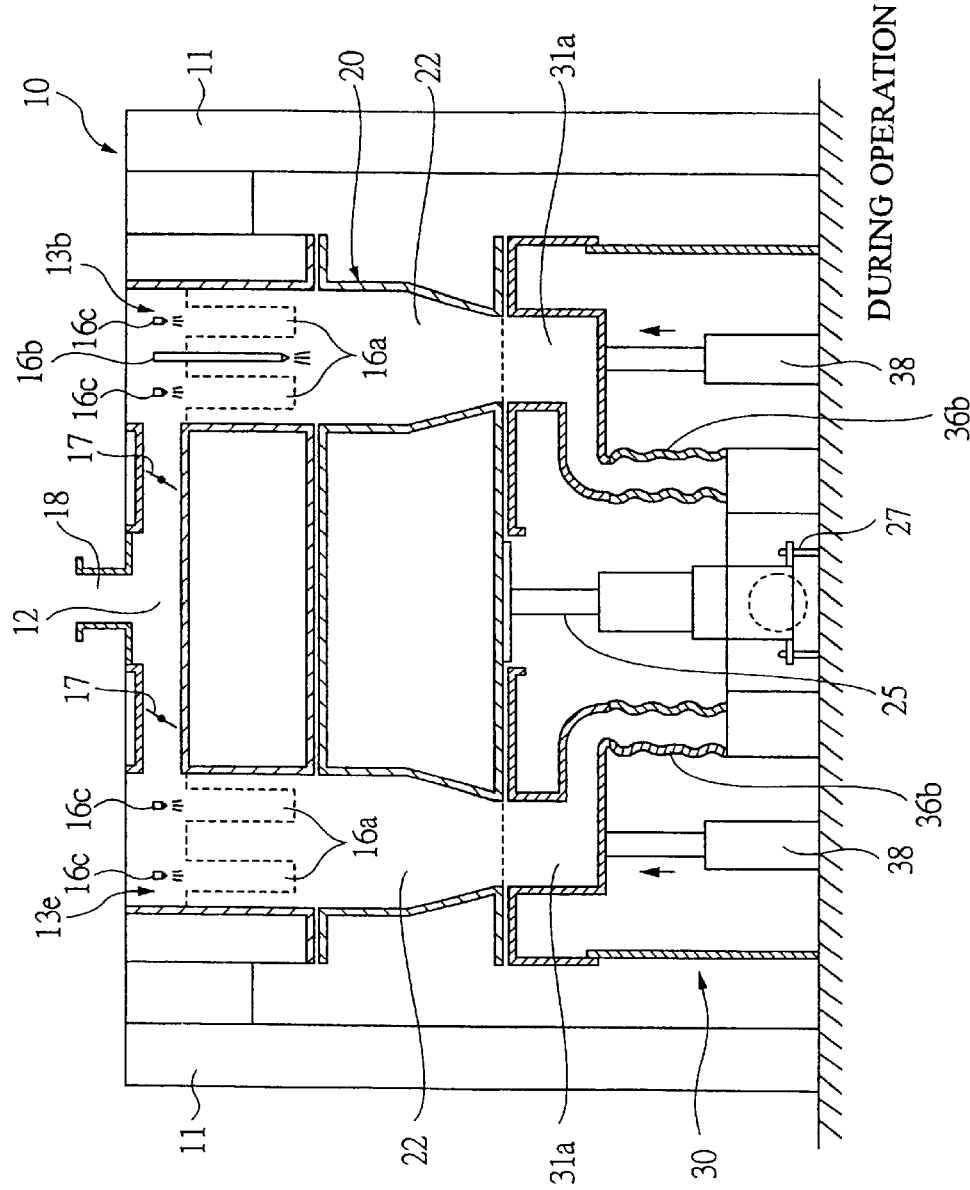
FIG. 2 is a cross-sectional view illustrating an operating condition of the fluidized bed granulation coating device according to an embodiment of the present invention.

An embodiment of the present invention will be described below and in details with reference to the drawings. FIG. 1 is a partially notched perspective view illustrating one example of a structure of a main body in a fluidized bed granulation coating device according to the present invention. FIG. 2 is a cross-sectional view illustrating an operating condition of the fluidized bed granulation coating device according to the present invention. FIG. 3A is a plan view of an upper processing section of the fluidized bed granulation coating device and FIG. 3B is a cross-sectional view thereof. FIG. 4A is a plan view of an intermediate storing section of the fluidized bed granulation coating device and FIG. 4B is a cross-sectional view thereof. FIG. 5A is a plan view of a lower gas supply section of the fluidized bed granulation coating device and FIG. 5B is a cross-sectional view thereof.

As illustrated in FIG. 1, a fluidized bed granulation coating device according to the present invention comprises: an upper processing section 10 including a plurality of function stations having respective functions of steps constituting a fluidized bed granulation coating process; an intermediate storing section 20 that is provided in a lower side of the upper processing section 10 and in which a plurality of powder grain storing vessels storing powder grains are rotatably arranged at positions radially extending from a rotational center thereof; and a lower gas supply section 30 provided in a lower side of the intermediate storing section 20 and supplying gas to the intermediate storing section 20.

As illustrated in FIG. 2, the upper processing section 10 is supported and fixed by columns 11 at a predetermined height from a setting position. The upper processing section 10 is provided with a chamber 12 in a center thereof as illustrated in FIGS. 1 and 3, and a plurality of function stations 13 evenly spaced out at radial positions from the position of the chamber 12, that is, on the same circumference surrounding the chamber 12 centered.

The function stations 13 comprise a raw material supply station 13a, a granulation coating station 13b, a granulation coating station 13c, a granulation coating station 13d, a drying station 13e, and a product discharging station 13f in this order of a clockwise direction in the case as illustrated in FIGS. 1 and 3.

The raw material supply station 13a is formed in a straight-pipe shape, of which an upper end is closed and a lower end opens to a lower connecting outlet 13g. In the inner space of the station 13a, a raw material supplying piping 14 and an exhaust coupling pipe 15a that communicates to the chamber 12 are communicated. A damper 17 for adjusting an amount of passing gas is provided in the exhaust coupling pipe 15a.

Each of the granulation coating stations 13b, 13c and 13d is closed at an upper end thereof as illustrated in FIG. 1, and formed in a straight-pipe shape similar to the raw material supply station 13a, and provided with a bag filter 16a and a spray gun 16b inside the pipe. A pulse jet nozzle 16c for preventing the bug filter 16a from clogging is provided above the bug filter 16a. Additionally, in the inner spaces of the granulation coating stations 13b, 13c and 13d, as illustrated in FIGS. 3A and 3B, exhaust coupling pipes 15b, 15c and 15d communicated to the chamber 12 are communicated, respectively. In each of the exhaust coupling pipes 15b, 15c, and 15d, a damper 17 is provided.

The granulation coating stations 13b, 13c and 13d may be constituted, for example, so as to sequentially perform steps subdividing a granulation step, such as preliminary granulation, a first granulation step, a second granulation step and the like. Alternatively, these three stations may be constituted so as to each have the same granulation function. Additionally, granulation and coating may be performed at the same time. Further, only coating may be performed.

The drying station 13e is also formed in a straight-pipe shape, of which an upper end is closed similarly to the raw material supply station 13a. The station 13e is provided, inside the pipe, with a bug filter 16a and a pulse jet nozzle 16c for preventing the bug filter 16a from clogging. Further, an exhaust coupling pipe 15e communicating to the chamber 12 is communicated in the inside space of the pipe, and a damper 17 is provided inside the exhaust coupling pipe 15e.

The chamber 12 communicated to the inside of each station through the exhaust coupling pipes 15a, 15b, 15c, 15d and 15e is provided with an exhaust pipe 18 such that the exhaust from the respective stations can be exhausted to the outside of a main body of the fluidized bed granulation coating device. In the exhaust, a degree of opening or closing the damper 17 is adjusted to adjust the amount of exhaust, or, if necessary, the station to be exhausted by closing some of the dampers 17 is selected.

The product discharging station 13f is also formed in a straight-pipe shape substantially similar to the raw material supply station 13a, and a product transporting pipe 19 is communicated to the inside space thereof from a ceiling side as a product discharging pipe. It is noted that since the exhausts for forming the fluidized bed and for discharging the products are performed by using different exhaust pipes, the product discharging station 13f is not communicated to the chamber 12.

Also, the case where the raw material supply station 13a and the product discharging station 13f are constituted as different stations in the above-mentioned function stations 13 has been described. However, the above-mentioned stations 13 may be constituted such that the same station has both of a raw material supplying function and a product discharging function by communicating the raw material supplying pipe 14 to the product transporting pipe 19 within the same space and providing the respective pipes with opening/closing valves in which one valve is closed when the other valve is used.

The intermediate storing section 20 to be provided in a lower side of the upper processing section 10 having the above-mentioned structure, as illustrated in FIGS. 1, 4A and 4B, is provided with a plurality of powder grain storing vessels 22 being at positions radially extending from the rotational center 21 and corresponding to positions of the respective function stations 13 of the upper processing section 10. The plurality of powder grain storing vessels 22 all have the same structure and are each formed in a substantially tube shape having a straight pipe portion 22a and a conical pipe portion 22b continuing therefrom. An upper connecting opening 23a that remains open is formed above the straight pipe portion 22a and a narrow-mouthed lower connecting opening 23b that remains open is formed below the conical pipe portion 22b.

The lower connecting opening 23b is provided with a powder grain drop preventing member 23c such as a porous plate, a wire mesh or the like, such that powder grains accommodated therein are not spilled from the powder grain storing vessels 22 while the powder grain storing vessels 22 move to the next station.

Each of the powder grain storing vessels 22 having the above-mentioned structure is formed such that a portion between both connecting openings is linked to the straight pipe portion 22a and the conical pipe portion 22b to be in a tube shape, in the state that a disk 24a in which the upper connecting opening 23a is opened and a disk 24b in which the lower connecting opening 23b is opened are faced to each other.

In the disk 24b, a lower portion of the rotational center 21, for-example, an up-and-down movable rotating shaft 25, is rotated by a motor 26, and thereby the disk 24b is rotated about the rotational center 21 centered, and the plurality of powder grain storing vessels 22 are rotated as the disk 24b is rotated. The rotation is made such that the lower connecting openings 13g of the respective function stations 13 of the upper processing section 10 and the upper connecting openings 23a of the powder grain storing vessels 22 of the intermediate storing section 20 can be positioned in a connectable manner.

The lower gas supply section 30 provided in a lower side of the intermediate storing section 20 is provided with a plurality of gas supply stations 31 as illustrated in FIGS. 1, 5A and 5B. The plurality of gas supply stations 31 are provided so as to correspond to the respective function stations 13 of the upper processing section 10. For example, in the case of FIGS. 5A and 5B, the gas supply stations 31 are provided so as to correspond to granulation coating stations 13b, 13c and 13d, a drying station 13e, and a product discharging station 13f. No corresponding gas station 31 is required for the raw material supply station 13a.

In the case illustrated in FIGS. 5A and 5B, fluidized bed forming gas supply stations 31a are provided so as to correspond to the granulation coating stations 13b, 13c and 13d, and the drying station 13e, and a product discharging gas supply station 31b is provided so as to correspond to the product discharging station 13f. Each of the plurality of fluidized bed forming gas supply stations 31a (31) are communicated to a common chamber 32, and the product discharging gas supply station 31b is separately constituted without being communicated to the chamber 32.

An gas supply piping 33 is connected to the chamber 32, such that the chamber is connected to an external gas supply source not shown through a gas supply opening 33a and can supply gas from the gas supply stations 31. The product discharging gas supply station 31b also is connected to a gas supply piping 34 exclusively provided for this, so that gas for discharging the products can be sent to the product discharging gas supply station 31b through a gas supply opening 34a.

It is noted that the chamber 32 is formed in a ring shape in the case illustrated in FIGS. 5A and 5B, such that gas can be uniformly supplied to the plurality of fluidized bed forming gas supply stations 31a communicating thereto in comparison with the case where the chamber is simply formed in a box shape.

The plurality of fluidized bed forming gas supply stations 31a are each formed in the same straight-pipe shape, of which each upper pipe end side is opened so as to correspond to the diameter of each of the lower connecting openings 23b of the powder grain storing vessels 22 and thereby the upper connecting openings 35 are constituted. Each lower pipe end side is closed, and each gas supply coupling tube 36a communicating to the inside of the tube extends from a side direction thereof. The gas supply coupling pipes 36a are respectively communicated to the chamber 32 via flexible tubes 36b being interposed between.

The fluidized bed forming gas supply stations 31a and the product discharging gas supply station 31b with the above-mentioned structure are formed such that, in the surface of a disk 37, the upper connecting openings 35 are opened so as to correspond to the lower connecting openings 23b provided in the disk 24b of the intermediate storing section 20 and such that straight pipes are formed are formed so as to have such upper connecting openings 35 as opening ends, extend below, close pipe ends, and have the above-mentioned gas supply coupling pipes 36a provided in respective sides thereof.

As illustrated in FIGS. 5A and 5B, each lower end side of two fluidized bed forming gas stations 31a located to oppose each other from among the plurality of fluidized bed forming gas supply stations 31a is supported by an up-and-down movable cylinder 38, such that the lower gas supply section 30 can be descended when the intermediate storing section 20 is rotated as will be described later.

A method of performing granulation coating of powder grain by employing the fluidized bed granulation coating device with the above-mentioned structure will be described.

By first ascending the cylinders 38 as illustrated in FIG. 1, the function stations 13 of the upper processing section 10, the powder grain storing vessels 22 of the intermediate storing section 20, and the gas supply stations 31 of the lower gas supply section 30 are matched at the respective connecting openings thereof. More particularly, the lower connecting openings 13g of the function stations 31 and the upper connecting openings 23a of the powder grain storing vessels 22 are kept in a connected state, and the lower connecting openings 23b of the powder grain storing vessels 22 and the upper connecting openings 35 of the gas supply stations 31 are kept in a connected state. At this time, deviation preventing pins 27 are mounted at a lower portion of the motor 26 such that the central shaft of the intermediate storing section 20 is prevented from deviating.

At this condition, powder grains to be the raw material are supplied into the raw material supply station 13a through the raw material supplying piping 14. In the raw material supply station 13a, the lower connecting opening 13g is, with it opened, connected to the upper connecting openings 23a of the powder grain storing vessels 22 of the intermediate storing section 20, so that the raw materials are supplied into the powder grain storing vessels 22. It is noted that no raw materials will drop since the powder grain drop preventing members 23c such as porous plates, wire meshes or the like are provided on the lower opening portions 23a of the powder grain storing vessels 22.

Figure 6:
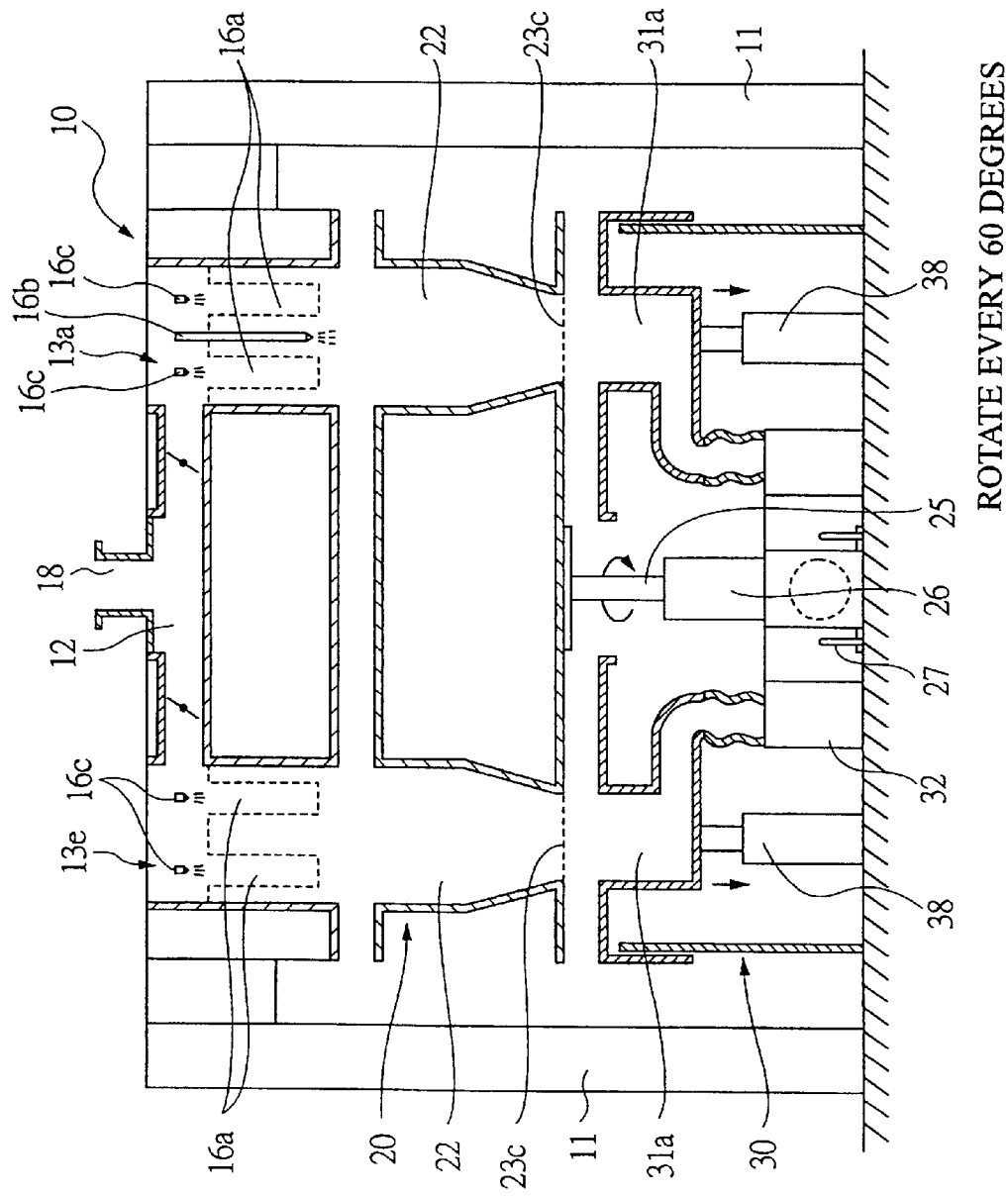
FIG. 6 is a cross-sectional view illustrating a rotating condition of the intermediate storing section of the fluidized bed granulation coating device according to one embodiment of the present invention.

After predetermined amount of raw material is supplied into the powder grain storing vessels 22, the lower gas supply section 30 is descended by the cylinders 38 to form a clearance between the lower gas supply section 30 and the intermediate storing section 20, and further the rotating shaft 25 that is constituted to be up and down movable is descended to separate the intermediate storing section 20 from the upper processing section 10. By making adjustments of descending the rotating shaft 25 and the cylinders 38, respective clearances are formed between the upper processing section 10, the intermediate storing section 20 and the lower gas supply section 30, as illustrated in FIG. 6, such that the intermediate storing section 20 can be rotated.

At this condition, the rotating shaft 25 is rotated by the motor 26 such that the respective powder grain storing vessels 22 proceed to the function stations 13 adjacent thereto. In the case illustrated by FIG. 1, the rotation is performed at a rotating angle of 60 degrees.

More particularly, the powder grain storing vesselr 22 having accommodated the powder grains in the raw material supply station 13a proceeds to the next granulation coating station 13b. The plurality of powder grain storing vessels 22 are provided to correspond to the respective function stations 13, so that when one powder grain storing vessel 22 proceeds to the function station 13 adjacent thereto, the remaining powder grain storing vessel 22 simultaneously proceed to the function stations 13 adjacent thereto.

In the granulation coating station 13b, the lower connecting opening 13g of the function stations 13 and the upper connecting openings 23a of the powder grain storing vessels 22 are respectively positioned, and also the lower connecting opening 23b of the powder grain storing vessels 22 and the upper connecting openings 35 of the gas supply stations 31 are respectively positioned. At this condition, the rotating shaft 25 and the cylinders 38 are ascended, and thereby the close connections between the lower connecting openings 13g of the function stations 13 and the upper connecting openings 23a of the powder grain storing vessels 22 as well as the close connections between the lower connecting openings 23b of the powder grain storing vessels 22 and the upper connecting openings 35 of the gas supply stations 31 are certainly performed.

It is noted that the above descriptions have paid attention to the granulation coating station 13b, but, even in the case of other function stations 13, the connecting conditions between the respective connecting openings of the function stations 13 of the upper processing section 10, the powder grain storing vessels 22 of the intermediate storing section 20 and the gas supply stations 31 of the lower gas supply section 30 are also similar to those of the granulation coating station 13b.

The powder grain storing vessel 22 having been advanced by the granulation coating station 13b as described above is supplied with gas through the fluidized bed forming gas supply station 31a and makes the powder grains changed to a fluidized bed state within the powder grain storing vessel 22. While the fluidized bed stated is kept, a suitable amount of spray liquid is sprayed from the spray gun 16b provided in the granulation coating station 13b to perform preliminary granulation for a predetermined period.

Meanwhile, while such preliminary granulation is performed, powder grains to be a raw material are supplied into the empty powder grain storing vessel 22 having reached the raw material supply station 13a similarly to the above-described manner.

After completion of the preliminary granulation in the granulation coating station 13b, the powder grain storing vessel 22 storing the powder grains preliminarily granulated is rotated similarly to the above-described manner, thereafter proceeding to the granulation coating station 13c adjacent thereto as a next step.

In the granulation coating station 13c, granulation of a first granulation step to be in a next stage is performed to the powder grains. While the first granulation step is being performed in the granulation coating station 13c, another new preliminary granulation of powder grains is performed in the granulation coating station 13b immediately precedent thereto. In addition, raw materials are supplied into the empty powder grain storing vessel 22 in the raw material supply station 13a.

After completion of the first granulation step in the granulation coating station 13c, the powder grain storing vessel 22 storing the powder grains obtained by completing the first granulation step is rotated, thereafter proceeding to the granulation coating station 13d adjacent thereto as a next step, similarly to the above-described manner.

In the granulation coating station 13d, a second granulation step to be in a next stage is performed to the powder grains obtained by completing the first granulation step. While the second granulation step is being performed in the granulation coating station 13d, another new first granulation step is performed to the powder grains obtained by completing the preliminary granulation in the granulation coating station 13c immediately precedent thereto. Moreover, another new preliminary granulation of powder grains is performed in the immediately precedent granulation coating station 13b. In addition, raw materials are supplied into the empty powder grain storing vessel 22 in the raw material supply station 13a.

After completion of the second granulation step in the granulation coating station 13d, the powder grain storing vessel 22 storing the powder grains obtained by completing the second granulation step is rotated, thereafter proceeding to the adjacent drying station 13e as a next step, similarly to the above-described manner.

In the drying station 13e, the powder grains obtained by completing the second granulation step are dried through gas supply to be sent from the downward fluidized bed forming gas supply station 31a. While such drying is performed in the drying station 13e, the second granulation step is performed to the powder grains obtained by completing the first granulation step in the granulation coating station 13d. In the immediately precedent granulation coating station 13c, another new first granulation step is performed to the powder grains obtained by completing the preliminary granulation. Further, in the immediately precedent granulation coating station 13b, another new preliminary granulation of powder grains is performed. In addition, raw materials are supplied into the empty powder grain storing vessel 22 at the raw material supply station 13a.

As described above, the powder grains have been sequentially granulated through the preliminary granulation, the first granulation step and the second granulation step in the respective stations of the granulation coating stations 13b, 13c and 13d are dried in the drying station 13e to be formed as products. The powder grain storing vessel 22 storing such products is rotated, thereafter proceeding to the adjacent product discharging station 13f as a next step, similarly to the above-described manner.

In the product discharging station 13f, the products accommodated in the powder grain storing vessel 22 is transported into, for example, a product storing tank or the like, through the product transporting pipe 19 by gas supply sent from the product discharging gas supply station 31b.

Thus, in the product discharging station 13e, products accommodated in the powder grain storing vessel 22 is discharged and the powder grain storing vessel 22 is emptied out.

Meanwhile, in the drying station 13e immediately precedent to the product discharging station 13f, the powder grains obtained by completing the second granulation step are dried through gas supply sent from below the fluidized bed forming gas supply station 31a. In the granulation coating station 13d immediately precedent to the drying station 13e, the second granulation step is performed to the powder grains obtained by completing the first granulation step. In the granulation coating station 13c immediately precedent to the granulation coating station 13d, another new first granulation step is performed to the powder grains obtained by completing the preliminary granulation. Moreover, another new preliminary granulation of powder grains is performed in the granulation coating station 13b immediately precedent thereto. In addition, raw materials are supplied into the empty powder grain storing vessel 22 in the raw material supply station 13a.

Thereafter, the powder grain storing vessel 22 having been emptied out by the discharge of products is rotated similarly to the above-explained manner and proceeds to the raw material supply station 13a. More particularly, the powder grain storing vessel 22 having been emptied out circulates once around a series of respective function stations 13 of the raw material supply station 13a, the granulation coating stations 13b, 13c and 13d, the drying station 13e, and the product discharging station 13f, and returns to the original raw material supply station 13a. Thus, by rotating the intermediate storing vessel 20 up to the required number of times, it is possible to perform granulation coating of a required amount.

The present invention is not limited to the above embodiment and can be variously changed without departing from the gist of the present invention.

While the above descriptions have been made of the case where the rotation of the intermediate storing section 20 is performed by rotating the motor 26 around the rotational center 21, for example, a circumferential end side of the disk 24b may be contacted to a driving roll 40 to be freely rotated and stopped by a motor 39, thereby being rotated, as illustrated in FIGS. 7A and 7B. In such a structure, the rotating shaft 25 may up-and-down moveably support the rotation.

While the above descriptions have been made of the case where six function stations 13 are provided, the number of function stations 13 described above may be arbitrarily set if necessary. That is, the number may be larger than or less than six.

While the granulation coating stations are respectively provided at three spots in the above descriptions, the granulation coating stations may be provided at two spots and the drying stations may be provided at two spots. That is, allocation of steps to the plurality of function stations can be freely made.

For example, there may be set one raw material gas supply station, two granulation coating stations, one drying station, one product discharging station and one powder grain storing vessel washing station.

While the above descriptions have been made of the case where the respective function stations, the powder grain storing vessels and the gas supply stations are disposed to circulate once on the same circumference with respect to the rotational center, they may be disposed to circulate twice or more on a concentric circumference.

While the respective function stations, the powder grain storing vessels and the gas supply stations evenly spaced out on the circumference around the rotational center regarded as a center are provided in the above descriptions, they may be unevenly spaced out within such a range that the respective powder grain storing vessels can necessarily correspond to the respective function stations.

While the above descriptions have been made of the case where the respective function stations, the powder grain storing vessels and the gas supply stations are provided on the circumference of the rotational center regarded as a center and are constituted to rotate in a rotary style, they may be constituted to circulate on, for example, an elliptic locus or a square locus. Namely, the function stations, the powder grain storing vessels and the gas supply stations may be arranged on a circulating locus like a picture drawn without lifting the brush from the paper.

By employing a locus other than a ring locus, for example, employing an elliptic locus, it is possible to increase the number of function stations that are set on the locus and to manufacture the products with steps further segmented. In the case where the respective function stations and the gas supply stations are provided on a locus other than the ring locus and where the powder grain storing vessels are sequentially moved between the function stations and the gas supply stations, a conventionally known moving means such as a conveyer method may be employed.

While the above descriptions have been made of the case where the powder grain storing vessels are constituted to sequentially proceed every one step to the respective function stations, they may be constituted to proceed between the respective function stations, for example, at intervals such as every other step or the like. By employing such constitutions, it is possible to perform granulation of different types in a parallel manner.

For example, by sequentially providing a granulating step using powder grains A and a granulating step using powder grains B, namely, by sequentially providing a total of eight function stations that are a powder grain A raw material supply station; a powder grain B raw material supply station; a powder grain A granulation coating station; a powder grain B granulation coating station; a powder grain A drying station; a powder grain B drying station; a product discharging station of products obtained from powder grain A; and a product discharging station of products obtained from powder grain B, it is possible to produce different products using the powder grains A and B in a parallel manner.

While the granulation coating stations and the drying station of the upper processing section, as well as the plurality of fluidized bed forming gas supply stations of the lower gas supply section are respectively constituted to be capable of performing common exhaust and common gas supply through chambers in the above descriptions, separate exhaust and gas supply may be individually performed to correspond to the respective function stations.

While the above descriptions have been made of such a structure that the upper processing section and the lower gas supply section are fixed and the intermediate storing section is rotated, for example, either the upper processing section or the lower gas supply section, or both in a direction opposite is/are rotated to the rotating direction of the intermediate storing section and thereby the time for proceeding to the next station can be shortened.

The above descriptions have been made of the case where the respective function stations are divided by functions for raw material supply, granulation coating, drying and product discharge and the granulation coating is performed by sequentially passing through these functions. However, for example, by selectively using these function stations, the fluidized bed granulation coating device of the present invention may be employed for the purpose of a single operation of, for example, only drying, only agitation, only granulation or only coating.

While the above descriptions have been made of the case where the respective function stations has a structure of the raw material supply station, the granulation coating stations, the drying station and the product discharging stations, other function stations may be added to the structure if necessary. For example, a mixing station for performing mixing may also have such a structure as to be provided between the raw material supply station and the granulation coating stations. In such a structure, as described above, the fluidized bed granulation coating device of the present invention may be used for the purpose of a single operation of only mixing.

(Embodiment 2)

FIG. 8 is a front view illustrating the fluidized bed granulation coating device of the present invention, in which the respective function stations are arranged on a straight line.

As illustrated in FIG. 8, the fluidized bed granulation coating device is provided with a plurality of function stations 100 having respective functions of steps constituting the fluidized bed granulation coating process, and a plurality of gas supply stations 200 disposed below the respective function stations 100. An storing vessel disposing space 310 is provided in an open state between the respective function stations 100 and the gas supply stations 200 corresponding thereto such that powder grain storing vessels 300 can be set therebetween.

More particularly, in the case illustrated by FIG. 8, the plurality of function stations 100 located above are arranged on a straight line such that a raw material supplying/pre-heating station 100*a* (100), a granulation coating station 100*b* (100), a drying station 100*c* (100) and a product discharging station 100*d* (100) evenly spaced out from each other. To correspond to the raw material supplying/pre-heating station 100*a*, the granulation coating station 100*b*, the drying station 100*c* and the product discharging station 100*d*, there are respectively provided gas supply stations 200*a* (200), 200*b* (200), 200*c* (200) and 200*d* (200), below them.

The raw material supplying/pre-heating station 100*a* is formed in a straight-pipe shape, of which an upper end is closed and a lower end remaining open has a lower connecting opening 110*a*. An exhaust pipe 120*a* and a raw material supplying pipe 130 are communicated to the inside space thereof and further the station 100*a* is provided with a bug filter 140*a*. A pulse jet nozzle 150*a* for preventing the bug filter 140*a* from clogging is provided above the bug filter 140*a*.

Below the raw material supplying/pre-heating station 100*a*, the storing vessel disposing space 310*a* for installing the powder grain storing vessels 300 as they stands is formed in an open state and thereby the gas supply station 200*a* is provided, and a gas supply pipe 210*a* is communicated to the inside thereof.

As illustrated in FIG. 1, the granulation coating station 100*b* is formed in a straight-pipe shape, of which an upper end is closed and a lower end, as it stands, opens to a lower connecting opening 110*b*. An exhaust pipe 120*b* is communicated to the inside space thereof, and further a bug filter 140*b* and a pulse jet nozzle 150*b* are provided. A spray gun 400 is additionally provided with a spraying outlet thereof directed downward.

Below the granulation coating station 110*b*, an storing vessel disposing space 310*b* is provided in an open state and thereby the gas supply station 200*b* is provided. A gas supply pipe 210*b* is communicated to the inside space thereof.

The drying station 100*c* is formed in a straight-pipe shape, of which an upper end is closed and a lower end, as it stands, opens to a lower connecting opening 110*c*. An exhaust pipe 120*c* is communicated to the inside space thereof. In the inside space is further provided a bug filter 140*c* and a pulse jet nozzle 150*c*. Below the drying station 100*c*, a storing vessel disposing space 310*c* is formed in an open state and thereby the gas supply station 200*c* is provided. A gas supply pipe 210*c* is communicated inside the gas supply station 200*c*.

The product discharging station 100*d* is also formed in a subsequently straight-pipe shape similar to the other function stations, and a product transporting pipe 160 is communicated to the inside space thereof from a ceiling side. Also below the product exhausting station 100*d*, a storing vessel disposing space 310*d* is formed in an open state and thereby a gas supply station 200*d* is provided. A gas supply pipe 210*d* is communicated to the inside of the gas supply station 200*d*.

Conveyers 500 are provided as moving means between the respective function stations of the raw material supplying/pre-heating station 100*a*, the granulation coating station 100*b*, the drying station 100*c* and the product discharging station 100*d*, and in a just front side of the raw material supplying/pre-heating station 100*a*, and in a just rear side of the product discharging station 100*d*.

As illustrated in FIG. 8, the conveyers 500 comprise a conveyer 500*a* provided from the just front side of the raw material supplying/pre-heating station 100*a* towards the raw material supplying/pre-heating station 100*a*; a conveyer 500*ab* linked between the raw material supplying/pre-heating station 100*a* and the granulation coating station 100*b*; a conveyer 500*bc* linked between the granulation coating station 100*b* and the drying station 100*c*; a conveyer 500*cd* linked between the drying station 100*c* and the product discharging station 100*d*; and a conveyer 500*d* provided in the just rear side of the product discharging station 100*d*.

Also, the powder grain storing vessel 300 is formed in a substantially tube shape comprising a straight pipe portion 300*a* and a conical portion 300*b* downward tapered therefrom. The upper end side of the straight pipe portion 300*a* is formed to be an upper connecting opening 320 in an open state as it stands, and the lower end portion of the conical portion 300*b* is formed to be a narrow-mouthed lower connecting opening 330 in an open state as it stands. In a side of the lower connecting opening 330 is disposed a powder grain drop preventing member 340 such as a porous plate, a wire mesh or the like, such that the powder grains accommodated therein are prevented from dropping off the inside of the powder grain storing vessels 300.

Fluidized bed granulation coating of powder grains is performed as follows by using the fluidized bed granulation coating device with the above structure.

As illustrated in FIG. 8, the powder grain storing vessel 300 is mounted on the conveyer 500*a* and transported to the raw material supplying/pre-heating station 100*a*. The powder grain storing vessel 300 enters the storing vessel disposing space 310*a*, so as to reach a predetermined position at which the upper connecting opening 320 of the powder grain storing vessel 300 can be connected to the lower connecting opening 110*a* of the raw material supplying/pre-heating station 10*a* and the lower connecting opening 330 of the storing vessel 300 can be connected to the upper connecting opening 220*a* of the gas supply station 200*a*. That the powder grain storing vessel 300 has reached the predetermined position is detected by a position detecting means such as a position sensor or the like, and the conveyer 500*a* is automatically stopped with a detection signal sent therefrom.

After stop of the powder grain storing vessel 300 at the predetermined position, the upper connecting opening 320 and the lower connecting opening 330 of the powder grain storing vessel 300 are respectively connected to the lower connecting opening 110*a* of the raw material supplying/preheating station 100*a* and the upper connecting opening 220*a* of the gas supply station 200*a*. In this manner, the raw material supplying/pre-heating station 100*a*, the powder grain storing vessel 300, and the gas supply station 200*a* are integrally connected, so that respective preparation for executing a raw material supplying step and a pre-heating step in the fluidized bed granulation coating process are completed.

Under this condition, a predetermined amount of raw materials is injected into the powder grain storing vessel 300 through the raw material supplying pipe 130 connected to a raw material supplying source (not shown) such as a raw material tank or the like. After injection of the raw material, a suction gas source not shown, which is connected to the exhaust pipe 120*a*, is started. By starting the suction gas source, warm gas is sucked into the powder grain storing vessel 300 through the gas supply station 200*a* connected under the powder grain storing vessel 300 and the gas supply pipe 210*a*. The warm gas sucked blows upward while the raw materials in the powder grain storing vessel 300 are changed into fluidized bed conditions, and is exhausted through the exhaust pipe 120*a*. Since the warm gas passes through the raw materials, pre-heating of the raw materials is performed.

It is noted that, in exhausting the warm gas through the exhaust pipe 120*a* of the raw material supplying/pre-heating station 100*a*, since the warm gas is made to pass through the bug filter 140*a* on the way, the raw materials contained in the warm gas are eliminated. Also, the bug filter 140*a* may be prevented from clogging, for example, by blowing the pulse jet nozzle 150*a* per a predetermined period.

After completion of pre-heating of the raw materials, the connection between the lower connecting opening 110*a* of the raw material supplying/pre-heating station 100*a* and the upper connecting opening 320 of the powder grain storing vessel 300 and the connection between the upper connecting opening 220*a* of the gas supply station 200*a* and the lower connecting portion 330 of the powder grain storing vessel 300 are released, respectively. After release of the connections, the conveyer 500*ab* is started to move the powder grain storing vessel 300 to a side of the granulation coating station 100*b* for executing a next step.

The powder grain storing vessel 300 storing the pre-heated raw materials is transported by the conveyer 500*ab* and enters the storing vessel disposing space 310*b*, and the powder grain storing vessel 300 reaches such a predetermined position that the upper connecting opening 320 of the powder grain storing vessel 300 and the lower connecting opening 110*a* of the granulation coating station 100*b*, as well as the lower connecting opening 330 of the powder grain storing vessel 300 and the upper connecting opening 220*b* of the gas supply stations 200*b* can be connected, respectively. The fact that the powder grain storing vessel 300 has reached the predetermined position is detected by a position detecting means such as a position sensor or the like, and the conveyer 500*ab* is automatically stopped by a detection signal sent therefrom.

After stop of the powder grain storing vessel 300 at the predetermined position, the upper connecting opening 320 and the lower connecting opening 330 of the powder grain storing vessel 300 are respectively connected to the lower connecting opening 110*b* of the granulation coating station 100*b* and the upper connecting opening 220*b* of the gas supply station 200*b*. In this manner, the granulation coating station 100*b*, the powder grain storing vessel 300, and the gas supply station 200*b* are integrally connected, so that a preparation for executing the granulation coating step of the fluidized bed granulation coating process is completed.

Under such condition, a suction gas source not shown, which is connected to the exhaust pipe 120*b*, is started. By starting the suction gas source, a fluidized beds forming gas is sucked into the powder grain storing vessel 300 through both of the gas supply station 200*b* connected under the powder grain storing vessel 300 and the gas supply pipe 210*b*. The fluidized beds forming gas sucked therein passes downward to upward in the powder grain storing vessel 300, and the pre-heated raw materials are changed into fluidized bed conditions during the passing. The fluidized beds forming gas having passed through the powder grain storing vessel 300 is exhausted through the exhaust pipe 120*b*.

In the powder grain storing vessel 300, a required amount of spray liquid is sprayed from a spray gun 400 toward the powder grains that each are in a fluidized bed state, and thereby required granulation or coating step, or both of the granulation and coating steps is performed.

It is noted that when the fluidized beds forming gas is exhausted through the exhaust pipe 120*b* of the granulation coating station 100*b*, the powder grains contained in the fluidized beds forming gas are eliminated since the forming gas passes through a bug filter 140*b* on the way. The bug filter 140*b* is prevented from clogging by blowing a pulse jet nozzle 150*b*.

After completion of the granulation step, the connection between the lower connecting opening 110b of the granulation coating station 100b and the upper connecting opening 320 of the powder grain storing vessel 300 as well as the connection between the upper connecting opening 220b of the gas supply station 200b and the lower connecting portion 330 of the powder grain storing vessel 300 are released, respectively. After release of the connections, the conveyer 500bc is started to move the powder grain storing vessel 300 to a side of the drying station 100c for executing a next step.

The powder grain storing vessel 300 storing the powder grains granulated or coated is transported by the conveyer 500bc and enters the storing vessel disposing space 310c, and the powder grain storing vessel 300 reaches such a predetermined position that the upper connecting opening 320 of the powder grain storing vessel 300 and the lower connecting opening 110c of the drying station 100c as well as the lower connecting opening 330 of the powder grain storing vessel 300 and the upper connecting opening 220c of the gas supply station 200c can be connected, respectively. The fact that the powder grain storing vessel 300 has reached the predetermined position is detected by a position detecting means such as a position sensor or the like, and the conveyer 500bc is automatically stopped by a detection signal sent therefrom.

Thus, after stop of the powder grain storing vessel 300 at the predetermined position, the upper connecting opening 320 and the lower connecting opening 330 of the powder grain storing vessel 300 are respectively connected to the lower connecting opening 110c of the drying station 100c and the upper connecting openings 220c of the gas supply station 200c. In this manner, the drying station 100c, the powder grain storing vessel 300, and the gas supply station 200c are integrally connected, so that a preparation for executing the drying step in the fluidized bed granulation coating process is completed.

Under such condition, a suction gas source not shown, which is connected to the exhaust pipe 120c, is started. By starting the suction gas source, a drying gas is sucked into the powder grain storing vessel 300 through the gas supply station 200c connected downward of the powder grain storing vessel 300 and the gas supply pipe 210c. The drying gas sucked therein passes upward so that the powder grains having been already granulated and/or coated in the powder grain storing vessel 300 are changed into a fluidized bed state and are dried, and is exhausted through the exhaust pipe 120c.

It is noted that when the drying gas is exhausted through the exhaust pipe 120c of the drying station 100c, the powder grains contained in the drying gas are eliminated by passing through a bug filter 140c on the way. The bug filter 140c is prevented from clogging by, for example, blowing a pulse jet nozzle 150c.

After completion of the drying step, connection between the lower connecting opening 110c of the drying station 100c having been connected and the upper connecting opening 320 of the powder grain storing vessel 300 as well as the connection between the upper connecting opening 220c of the gas supply station 200c and the lower connecting portion 330 of the powder grain storing vessel 300 are released, respectively. After release of the connection, the conveyer 500cd is started to move the powder grain storing vessel 300 toward a side of the product discharging station 100d for executing a next step.

The powder grain storing vessel 300 storing the powder grains dried is transported by the conveyer 500cd to enter the storing vessel disposing space 310d, and the powder grain storing vessel 300 reaches such a predetermined position that the upper connecting opening 320 of the powder grain storing vessel 300 and the lower connecting opening 110d of the product discharging station 100d, as well as the lower connecting opening 330 of the powder grain storing vessel 300 and the upper connecting opening 220d of the gas supply station 200d can be connected. The fact that the powder grain storing vessel 300 has reached this predetermined position is detected by a position detecting means such as a position sensor or the like and the conveyer 500cd is automatically stopped by a detection signal sent therefrom.

After termination of the powder grain storing vessel 300 at the specified position, the upper connecting opening 320 and the lower connecting opening 330 of the powder grain storing vessel 300 are respectively connected to the lower connecting opening 110d of the product discharging station 100d and the upper connecting opening 220d of the gas supply station 200d. In this manner, the product discharging station 100d, the powder grain storing vessel 300, and the gas supply station 200d are integrally connected, so that a preparation for executing the product discharging step from of the fluidized bed granulation coating process is completed.

Under this condition, a suction gas source not shown, that is connected to the product transporting pipe 160, is started, and a products transporting gas is sucked through the gas supply stations 200d connected downward of the powder grain storing vessel 300 and the gas supply pipe 210d, and this gas carries products into the powder grain storing vessel 300 to, for example, a product storing tank or the like through the product transporting pipe 160.

After completion of the product discharging step, the connection between the lower connecting opening 110d of the product discharging station 100d and the upper connecting opening 320 of the powder grain storing vessel 300 as well as the connection between the upper connecting opening 220d of the gas supply station 200d and the lower connecting portion 330 of the powder grain storing vessel 300 is released. After release of the connections, the conveyer 500d is started to detach the powder grain storing vessel 300 from the product discharging station 100d.

By moving the detached powder grain storing vessel 300 onto the conveyer 500a with a suitable transporting means such as a forklift or the like, the powder grain storing vessel 300 can be repeatedly circulated and used by the desired number of times. Alternatively, for example, the vessel 300 may be transported to a vessel washing step without the repeated circulation and use.

The above descriptions has been made of the case of executing the respective steps constituting the fluidized bed granulation coating process using the respective function stations, by paying attention to a single powder grain storing vessel that is sequentially moved from the raw material supplying/pre-heating station to the granulation coating station, the drying station and the product discharging station in this order. Also, there are actually employed the plurality of powder grain storing vessels so that none of the function stations remain empty.

More particularly, the powder grain storing vessels are sent to the next step after completion of each function at the function stations and the powder grain storing vessels are received after the previous step has been completed, so that production can be performed in an effective manner.

It is noted that, without using the plurality of powder grain storing vessels, for example, the fluidized bed granulation coating process may be constituted to sequentially move the single powder grain storing vessel in step order.

Thus, if attention is paid to the fact that the respective steps constituting the fluidized bed granulation coating process are performed while the powder grain storing vessels stay in the respective function stations, the fluidized bed granulation coating device of the present invention is regarded as being performed by a process of a batch type. Meanwhile, if attention is paid to the fact that the respective steps are subsequently executed while the powder grain storing vessels are subsequently moved to the plurality of function stations, the fluidized bed granulation coating device is regarded as being performed by a process of a continuous type. Therefore, the fluidized bed granulation coating device can be regarded as being performed by a process of a semi-continuous type having advantages obtained by both processes of a batch type and a continuous type.

(Embodiment 3)

Figure 9:
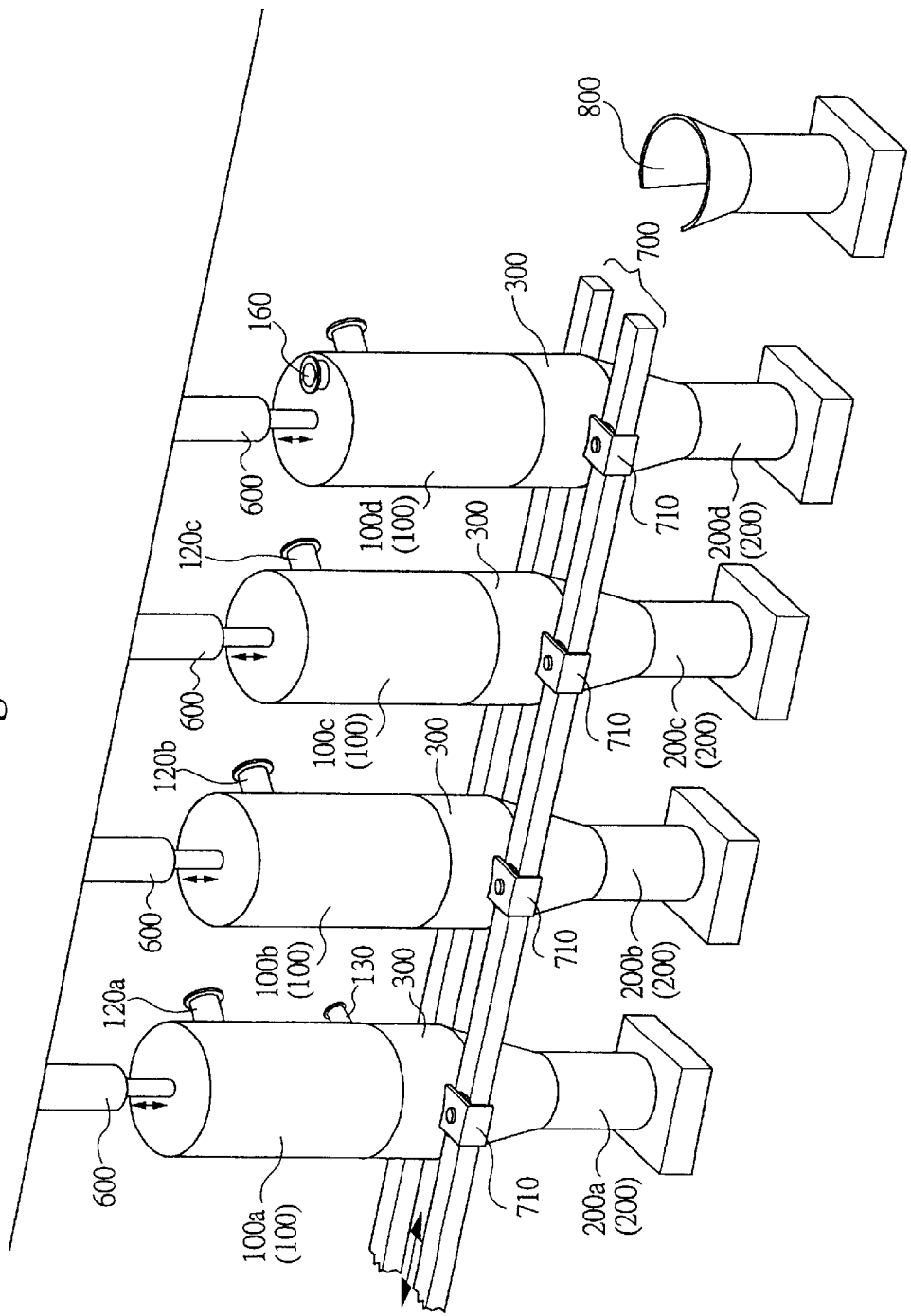
FIG. 9 is an overall perspective view illustrating a modified example of the fluidized bed granulation coating device according to an embodiment of the present invention.
Figure 10:
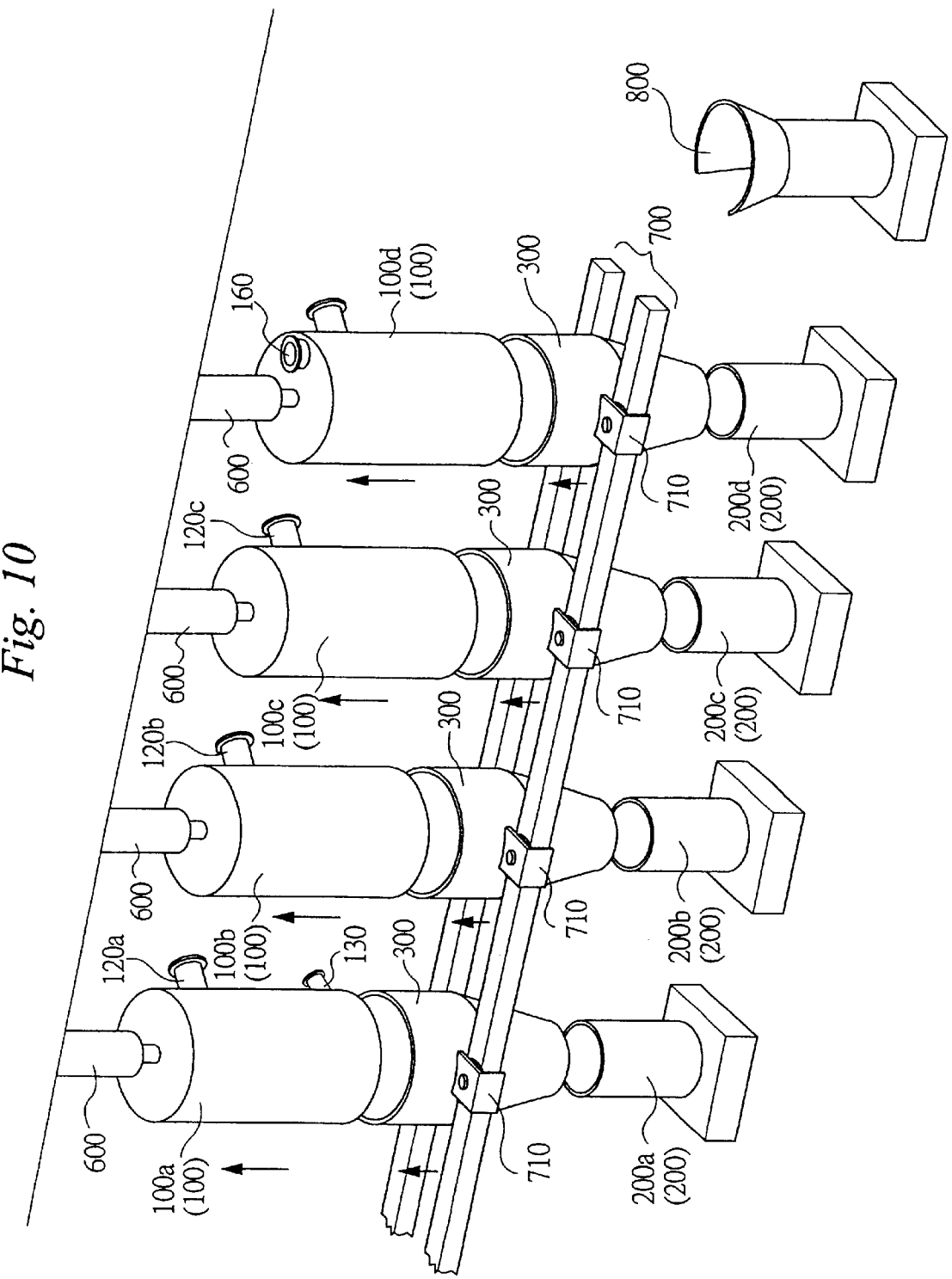
FIG. 10 is a perspective view illustrating a condition in which function stations and powder grain storing vessels are respectively lifted upward in the fluidized bed granulation coating device as illustrated in FIG. 9.
Figure 11:
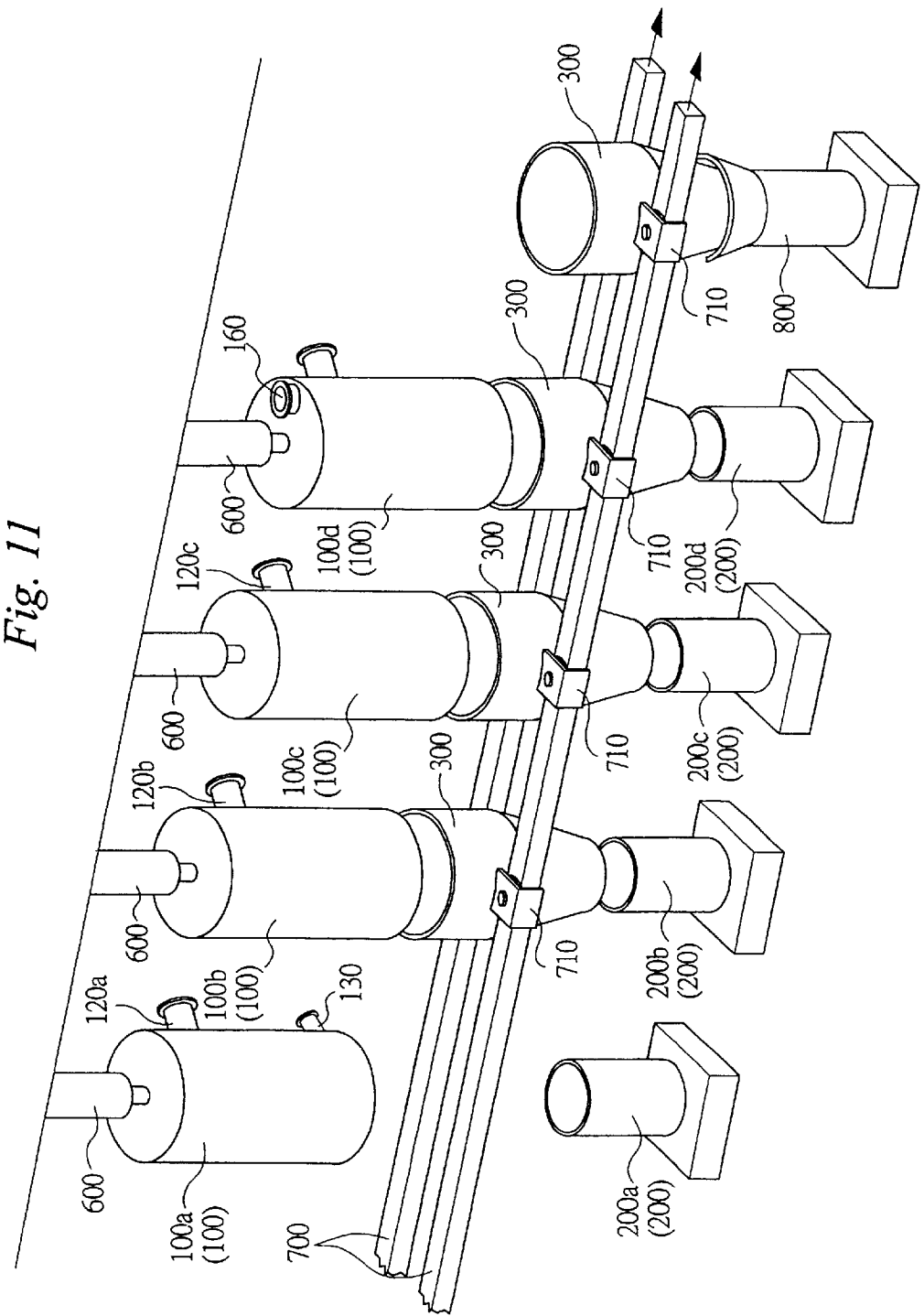
FIG. 11 is a perspective view illustrating a condition in which a plurality of powder grain storing vessels has proceeded to a next step from the state of the fluidized bed granulation coating device as illustrated in FIG. 10.

FIG. 9 is a perspective view illustrating an overall structure of the fluidized bed granulation coating device described in the present embodiment. FIG. 10 is a perspective view illustrating a condition in which function stations and powder grain storing vessels are respectively lifted upward in the fluidized bed granulation coating device as illustrated in FIG. 9. FIG. 11 is a perspective view illustrating a condition in which a plurality of powder grain storing vessels has proceeded to a next step from the state of the fluidized bed granulation coating device as illustrated in FIG. 10.

In the present embodiment, the raw material supplying/pre-heating station 10a (100), the granulation coating station 100b (100), the drying station 100c (100) and the product discharging station 100d (100) constituting the fluidized bed granulation coating process are respectively provided to be movable up and down through an elevating arm 600. The respective stations 100 are constituted similarly to the constitution having been already described with reference to Embodiment 1.

There are provided powder grain storing vessels 300 under the plurality of function stations 100, respectively. More particularly, lower connecting openings of the respective function stations 100 and upper connecting openings of the powder grain storing vessels 300 are connected in a fitting manner of being fitted to each other.

Under the plurality of powder grain storing vessels 300, there are respectively connected respective gas supply stations 200 (200a, 200b, 200c and 200d) in a fitting style, in which the upper connecting openings of the respective gas supply stations 200 and lower connecting openings of the powder grain storing vessels 300 are mutually connected in a fitted manner of being fitted to each other.

In this manner, raw materials are injected into the powder grain storing vessels 300 in the raw material supplying/pre-heating station 100a while the upper function stations 100, the powder grain storing vessels 300 and the gas supply stations 200 are integrally connected, respectively, and pre-heating is thereafter performed through warm gas.

In the granulation coating station 100b, the preheated raw materials are each sprayed with a spraying liquid in a fluidized bed state, and granulation and/or coating thereof is performed. In the drying station 100c, the granulated and/or coated powder grains are each dried in the fluidized bed state. In the product discharging station 100d, discharge of products is performed through the products transporting pipe 160.

When each step of the function stations is completed, the respective function stations 100 are lifted to respective predetermined heights by the elevating arms 600 to release the respective connections between the function stations 100 and the powder grain storing vessels 300 as illustrated in FIG. 10.

Thereafter, the powder grain storing vessels 300 that are detachably engaged with horizontal moving members 700 through engaging members 710 are lifted as the horizontal moving members 700 are lifted upward, so that the connections between the lower connecting openings of the powder grain storing vessels 300 and the upper connecting openings of the gas supply stations 200 are released, respectively.

Thus, in the state that each connection of the upper connecting openings of the powder grain storing vessels 300 is released, as illustrated in FIG. 11, the horizontal moving member 700 is moved horizontally and thereby the powder grain storing vessels 300 are moved to the next function stations, respectively. In the state that they have proceeded to the positions of the next function stations, until the lower connecting openings of the powder grain storing vessels 300 can be respectively connected to the upper connecting openings of the gas supply stations 200 in a fitting manner, the horizontal moving members 700 are descended.

The horizontal moving members 700 further descend until each engagement with the engaging members 710 is released, and horizontally move toward the original direction to return to the original positions as illustrated in FIG. 8, and thereafter moves slightly and upward. Thereby, with the engaging member 710 being engaged with the horizontal moving member 700, the horizontal moving member 700 prepares each next movement of the powder grain storing vessels.

Meanwhile, the function stations 100 having been on standby upwards is descended by the elevating arms 600, so that the lower connecting openings of the function stations 100 and the upper connecting openings of the powder grain storing vessels 300 are connected in a fitting manner. In this manner, each step function is performed while the function stations 100, the powder grain storing vessels 300 and the gas supply stations 200 are integrally connected.

Further, as illustrated in FIGS. 10 and 11, the powder grain storing vessel 300 having completed the product discharging step in the product discharging station 100d is moved by a storing vessel receiving member 800 to be in a held state. The empty powder grain storing vessel 300 is moved from the storing vessel receiving member 800 by a proper transporting means such as a forklift or the like.

The present invention also is not limited to any of the above-mentioned embodiments, but may be changed and modified if necessary.

For example, the above-mentioned descriptions have been made of the case of providing, as a fluidized bed granulation coating process, the raw material supplying/preheating station, the granulation coating station, the drying station and the product discharging station, but, if necessary, a station such as a mixing station specified by a function of mixing the powder grains, or a washing function station for washing the powder grain storing vessels, or the like may be added thereto.

Moreover, the function stations may be further divided, for example, the raw material supplying/preheating station is divided into a raw material supplying station and a preheating station, or the granulation coating station is divided into a granulation station and a coating station, or a plurality of different granulation coating stations are divided, or the like.

Further, a plurality of function stations may be united to be a single function station, for example, the drying station and the product discharging station are united to be a single drying/product discharging station or the like.

The above-mentioned description has been made of the case of arranging the respective stations on a straight line. However, it is not necessarily required to dispose the respective stations on a straight line, and the respective stations may be disposed on a zigzag line, a bent line or a curved line.

INDUSTRIAL APPLICABILITY

According to the present invention, fluidized bed granulation coating can be performed since the powder grain storing vessels continuously move, for example, circulate or the like, through respective function stations, and so can improve the efficiency of production in comparison with the case where production is performed in a batch type.

The present invention is constituted such that the fluidized bed granulation coating is performed since the powder grain storing vessels move, for example, circulate or the like through the respective function stations by the required number of times. Therefore, the fluidized bed granulation coating has both elements of batch type production system and continuous type production system in a coexistence state, and thereby can not only have advantages of both systems but also eliminate disadvantages of both systems.

In the present invention, expansion of the production scale can be achieved by increasing the number of movements, for example, the number of circulation of the powder grain storing vessels, or the like, through the respective function stations. Therefore, granulation substances with the same quality can be obtained regardless of the production scale. Further, no scale up of devices in respective stages of study, test production and production is required and so it is hardly necessary to change operating conditions or the like and it is easy to move to the respective stages described above.

According to the present invention, such an arrangement can be employed that the respective function stations are disposed on a straight line, in addition to an arrangement in which the function stations are disposed in a circular line. Therefore, in this case, the respective function stations can also correspond to such a narrowly elongated space as not to be arranged in a circular line.

What is claimed is:

1. A fluidized bed granulation coating device comprising:
   an intermediate storing section having a plurality of powder grain storing vessels circulated by a circulating means;
   an upper processing section having a plurality of functional stations having respective functions of steps constituting a fluidized bed granulation coating process; and
   a lower gas supply section having gas supply stations,
   wherein said powder grain storing vessels of said intermediate storing section is stopped and circulated by said circulating means per each functional station, and
   wherein when said powder grain storing vessels are stopped at said functional stations, upper connecting openings of said powder grain storing vessels are connected to lower connecting openings of the respective functional stations of said upper processing section and lower connecting openings of said powder grain storing vessels are connected to an upper connecting opening of said gas supply stations of said lower gas supply section.

2. The fluidized bed granulation coating device according to claim 1, wherein said circulating means is a rotating means in which said plurality of powder grain storing vessels provided at the same circumferential positions about a rotational center are rotated around said rotational center regarded as a center.

3. The fluidized bed granulation coating device according to claim 1, wherein said plurality of functional stations include all or a part of a raw material supply station, a granulation coating station, a drying station and a product discharging station.

4. The fluidized bed granulation coating device according to claim 3, wherein said raw material supply station and said product discharging station are constituted by the same station with which a raw material supply pipe and a product discharging pipe are each provided selectively and usably.

5. The fluidized bed granulation coating device according to claim 3, wherein said granulation coating station and said drying station are communicated to a common exhaust opening through a chamber.

6. The fluidized bed granulation coating device according to claim 1, wherein said gas supply stations are separated into a fluidized bed forming gas supply stations and a product discharging gas supply station.

7. A fluidized bed granulation coating device comprising:
   a plurality of powder grain storing vessels moved by a moving means;
   a plurality of functional stations having respective functions of steps constituting a fluidized bed granulation coating process, and disposed in a non-circular state; and
   gas supply stations provided to correspond to said functional stations,
   wherein said powder grain storing vessels are stopped and moved per each functional station by said moving means, and
   wherein when said powder grain storing vessels are stopped at said functional stations, upper connecting openings of said powder grain storing vessels are connected to lower connecting openings of said functional stations and lower connecting openings of said powder grain storing vessels are connected to upper connecting openings of said gas supply stations.

8. The fluidized bed granulation coating device according to claim 7, wherein said plurality of functional stations are disposed on a substantially straight line.

9. The fluidized bed granulation coating device according to claim 7, wherein said plurality of functional stations include all or a part of a raw material supply station, a granulation coating station, a drying station and a product discharging station.

* * * * *